United States Patent [19]

Dickopp et al.

[11] 3,800,099

[45] Mar. 26, 1974

[54] STORING AND REPRODUCING INFORMATION AND CARRIER THEREFOR WITH ZONES OF DIFFERENT DEFORMATION CHARACTERISTICS

[75] Inventors: Gerhard Dickopp; Helmut Batsch, both of Berlin; Wilhelm Runge, Ulm, Danube, all of Germany

[73] Assignee: Ted Bildplatten Aktiengesellschaft AEG-Telefunken TELDEC, Zug, Switzerland

[22] Filed: Mar. 31, 1972

[21] Appl. No.: 239,960

[30] Foreign Application Priority Data

| | | |
|---|---|---|
| Mar. 31, 1971 | Germany | 2115480 |
| Mar. 9, 1972 | Germany | 2211389 |
| Mar. 9, 1972 | Germany | 7209047 |

[52] U.S. Cl. .................... 179/100.1 A, 179/100.1 B, 179/100.3 A, 179/100.3 V, 179/100.3 Z, 179/100.4 C, 178/6.6 A, 274/41 A

[51] Int. Cl. ......................... G11b 11/06, H04n 5/76

[58] Field of Search .............179/100.4 R, 100.4 M, 100.41 P, 179/100.1 R, 100.1 A, 100.1 B; 178/6.6 A, 6.6 TP; 340/173 TP

[56] References Cited

UNITED STATES PATENTS 3,652,809 3/1972 Dickopp et al. ............. 179/100.4 R

OTHER PUBLICATIONS

Nepela et al., Readout Device for Digital Information Stored by Surface Relief Techniques, IBM Tech. Disclosure Bulletin, Vol. 8, No. 10, 3/66.

*Primary Examiner*—Raymond F. Cardillo, Jr.
*Attorney, Agent, or Firm*—Spencer & Kaye

[57] ABSTRACT

An information carrier for use in a signal reproducing system in which a pressure-responsive pickup bears against and compresses the carrier while traveling along an information-containing path on the carrier surface, the pickup being substantially immovable in the direction in which it bears against the carrier and producing an output proportional to the reaction force exerted by the carrier on the pickup, information being stored along the path in the form of zones of differing mechanical hardness. Such carrier can be produced by applying a suitable radiation in an appropriate intensity pattern to a suitably deformable material whose hardness can be modified by such radiation.

23 Claims, 15 Drawing Figures

STORING AND REPRODUCING INFORMATION AND CARRIER THEREFOR WITH ZONES OF DIFFERENT DEFORMATION CHARACTERISTICS

BACKGROUND OF THE INVENTION

The present invention relates to the storing and reproducing of information using a carrier, reproduction from the carrier being effected by moving a pressure responsive pickup along a predetermined track of the carrier and pressing the pickup against the carrier while causing the pickup to be substantially stationary relative to the direction in which it is pressed against the carrier so that deformable surface zones of the carrier exert a fluctuating pressure on the scanning surface which depends on the stored information, the pressure resulting from the compression of the carrier surface due to the contact pressure exerted by the pickup.

The present invention further relates to a carrier for this purpose and to a method for producing this carrier.

The above-mentioned process for storing and reproducing information is disclosed in U.S. Pat. No. 3,652,809, issued to Gerhard Dickopp, Hans-Joachim Klemp, Horst Redlich and Eduard Schuller on Mar. 28, 1971. This patent discloses a system of the type described above and illustrates a carrier on which the information is stored in the form of spatial undulations formed in mechanically deformable, and preferably elastically deformable, surface portions of the carrier.

The scanning surface of the pickup remains, during scanning of the relief structure constituted by the undulations, immovable in the direction of the reaction forces exerted by the surface portions of this structure, while the deformable structure portions of the carrier which come to lie under the scanning surface of the pickup exert reaction pressure forces on the scanning surface due to their changes in shape, fluctuations in this force during the passage of the carrier surface under the scanning surface being converted into an electrical signal by a mechanical-electrical transducer incorporated in the pickup. This known system is particularly suited for recording and playback of a broadbanded frequency mixture, e.g., television picture signals.

A more detailed description of this known system will be found in

Internationale Elektronische Rundschau, July, 1970, pages 195 et seq.

and in

Journal of the Audio Engineering Society, Volume 18, number 6, December, 1970, pages 618–623.

The presently used carriers for recording information in the known system are generally called picture records. Due to the large information flow per unit time, and thus the wide frequency range to be covered during recording of, for example, a moving picture on such a record, playback involves rotating the picture record at a substantially higher playback speed than conventional phonograph records.

However, such a picture record, or more precisely the picture record original, cannot be cut at the same high speed required for playback, if — as for the photograph record — the relief structure is to be produced in grooves by a mechanical cutting tool. This tool, i.e., a cutting stylus, has such a high mechanical inertia that it could not possibly oscillate at the frequencies to be stored, which are, for example, in the range of several Megahertz.

For this reason a picture record, or the original for such a record, is produced by employing intermediate storage of the signals to be recorded, e.g., on a magnetic carrier, as is known in the phonograph record production art. This magnetic carrier is then played back at a reduced speed to drive the cutting stylus while the record blank is rotated at a corresponding reduced speed in order to record the signals on the picture record original.

Thus the original record is cut from signals picked up from the magnetic carrier at a speed which is slower than the playback speed required for the later playback of the picture record. In fact the time required for cutting the original of a picture record is in practice about 25 times the subsequent playback time for the picture record, when the playback is to reproduce the recorded event at its proper speed. This additional time required for producing the original is in many cases unacceptable, for example when recording actual events, e.g., sports events and the like, parts of which are to be played back almost immediately.

Another method for recording electrical signals, particularly picture signals, is disclosed in German Published Application No. 1,151,535. This method utilizes a thin layer of a material whose degree of polymerization can be varied by electron irradiation and scans the layer with an electron beam modulated with the signal to be recorded. The thus produced local differences in the degree of polymerization are converted into local differences in the layer thickness.

Thus, this method produces changes in the hills and dales on the surface of a carrier by a variation in the degree of polymerization. At the same time changes in the optical density of the carrier material are produced so that such a carrier can be scanned with the aid of light beams. For a pressure scan, however, i.e., for scanning with the aid of a pressure sensitive transducer as disclosed in U.S. Pat. No. 3,652,809, such a carrier is less suited because the hills and dales are too small.

Although the hills can be caused to swell by a treatment with solvents, this requires a time consuming process step which is undesirable for the mass production of carriers. The requirement in the known method that electron irradiation be employed also represents a certain drawback for mass production where, if irradiation is required at all, it would be preferable to employ light or ultraviolet light. When light or similar radiation is employed a greater number of records can be produced in a shorter time, as in the photocopying processes. In U.S. Application Ser. No. 168,073 filed by Horst Redlich and Hans-Joachim Klemp on Aug. 2, 1971, now U.S. Pat. No. 3,737,589 there is disclosed a recording technique which avoids the above-mentioned loss of time during recording on disc or tape-type signal carriers, in that an electron or laser beam which substantially forms a cutting edge is used to record the high frequency signals. This beam is to have a blade or wedge-shaped effect, i.e., its strongest effect is to be in its center where it has its greatest intensity. It has further been proposed in this connection to use as the recording carrier a photosensitive layer which, after recording, exhibits different degrees of darkening corresponding to the groove profile and to the signals to be produced on a picture record. This photographic "negative" can serve as a mask in a contact copying process and can be duplicated by means of this process.

A useful carrier for the copy has been proposed, inter alia, in the form of a homogeneous plastic carrier which can be cross-linked by irradiation. At the points which were not exposed, i.e., not cross-linked, the plastic can be removed after exposure of the copy, so that there is again produced a carrier with a groove whose surface exhibits deformations which correspond to the time sequence of the signal values.

One drawback of this method is that chemical processes are required to remove the unexposed parts. These processes considerably delay the completion of fabrication of the picture records.

SUMMARY OF THE INVENTION

It is an object of the present invention to eliminate these inherent drawbacks of the prior art techniques, and to assure compatibility, i.e., that the user of the picture records will be able to continue to use available instruments without modifications or with only slight modifications.

The present invention seeks to achieve this by employing a novel configuration for the record carrier on which information is recorded.

This is accomplished, according to the present invention, by providing the information on the carrier in the form of surface zones having a hardness which is different from that of surrounding surface zones, with respect to the forces produced by the scanning surface of the pickup due to its contact pressure and acting on the carrier surface in a manner to temporarily alter its shape by compression. The "hardness" referred to herein corresponds to resistance to deformation, in particular compression. In other words the carrier according to the invention is provided at its surface with a succession of zones along a path and at least along this path this surface is of a material which has a deformation resistance characteristic such that deformation of the carrier surface at each zone by the same amount produces a reaction force which varies in value from one zone to the next in correspondence to the stored signals. The reaction forces are those experienced by the pickup.

The signal reproducing method of the present invention can thus be carried out using the pickup described above with reference to U.S. Pat. No. 3,652,809. The carrier according to the present invention, however, has mechanically depressable surface zones of differing hardness, i.e., differing deformability. The pattern of these surface zones along the scanning track, i.e., their number per unit length and/or their length or their spacing, constitutes the stored form of the recorded information.

The feature that surface zones of differing hardness follow one another along the track may involve, for example, the provision of alternating deformable surface zones with respectively different resistances to changes in shape at the intended scanning speed. These zones may be both elastically and permanently deformable. However, surface zones with only different elastic deformabilities, i.e., with different moduli of elasticity, can also alternate with one another. Finally, surface zones with different permanent deformabilities can also be provided in succession, i.e., these surface zones will exhibit differing resistances to plastic deformation, which resistance depends at least in part on the speed at which their shape is caused to change.

The material of the less hard surface zones must be sufficiently compressible, at least when there is no possibility of escaping from the pressure effect of the scanning surface of the pickup, i.e., its Poisson's ratio $\mu$ should be substantially below 0.5. The term Poisson's ratio is described in Hutte "Des Ingenieurs Taschenbuch" [Engineer's Handbook], volume 1, published by Wilhelm Ernst and Sohn, Berlin, 28th Edition, 1955, page 838.

The scanning of such a carrier takes place in a manner analogous to that described in U.S. Pat. No. 3,652,809. The peaks or hills described there correspond to surface zones having a greater hardness in records according to the present invention, while the spaces between raised portions, constituting valleys or dales described in U.S. Pat. No. 3,652,809, correspond in the present case to surface zones having a lesser hardness.

A carrier according to the invention is characterized in that it has surfaces zones having, alternatingly, greater or lesser hardness with respect to forces exertable by the contact surface of a pickup for the purpose of changing the shape of the surface zones. These surface zones alternate along a given track, or path, and their pattern corresponds to the information sequence.

Preferably such a carrier has, along the track, no substantial surface unevennesses which would be able to exert substantial pressures on the scanning surface of a pickup guided along the track during scanning. Large surface unevennesses would adversely influence the successful playback of the information from the carrier, particularly if such unevennesses were to consist of raised portions at those surface zones which have a lesser hardness.

If these raised portions, however, were disposed at those surface zones which have a greater hardness, they would do no harm. In view of this a further embodiment of the carrier according to the present inventions may be characterized in that along the track the surface zones have the greater hardness protrude further from the surface of the track than the surface zones of lesser hardness.

The most favorable embodiment of the carrier according to the present invention is one in which the surface portions which form the intermediate regions between adjacent tracks, or adjacent turns of a spiral track, have a greater hardness than at least those surface zones of the track which are of lesser hardness. These hard intermediate regions are able to exert guiding forces on the pickup during scanning.

The pickup sinks somewhat into the surface of the track consisting of surface zones having differing degrees of hardness. The hard intermediate regions between adjacent tracks, however, cannot be compressed by the pickup to the same degree as can the surface zones of the track, so that these hard intermediate regions act in the same manner as the walls of the groove of a phonograph record or picture record and exert guiding forces on the pickup. This type of pickup guidance has in all cases been found to be the easiest and safest, a positive coarse guiding of the pickup being of additional value.

The above described preferred embodiment of a carrier according to the present invention with hard intermediate regions between adjacent tracks, or turns of the spiral track, is of particular importance because it permits the exertion of guiding forces on the pickup in spite of the substantially smooth surface of the carrier. Without the hard intermediate regions it would be very difficult, if not impossible, to guide the pickup accurately along the intended track.

The hardness of the intermediate regions may preferably be the same as that of the surface zones of the track having the greatest hardness. This feature permits the manufacture of the hard intermediate regions bordering the track simultaneously with the production of the track, and without any additional effort.

However, the information track may also be disposed in a groove. This arrangement is particularly well suited for recording carriers in which the recording is made in a preshaped groove of the carrier. This preshaped groove may serve to guide the recording member, which may for example include a photo-conductor. The intermediate regions between adjacent tracks, or adjacent turns of a spiral track, may then form a dam, or barrier, which increases the guiding forces exerted on the pickup during playback to maintain it on the track.

The carrier may be made of a plastic material which can be cross-linked by irradiation and which stores the information as portions, or zones, of differing hardness, the hardness pattern corresponding to the information. Or the carrier may be a polymerizable plastic. In either case it does not matter whether the harder surface zones and the regions between adjacent tracks and adjacent track turns were produced by cross-linking or polymerization of the plastic or whether the less hard surface zones of the track were produced by depolymerization of the plastic.

The carrier may be made, for example, of polyolefin or of a low pressure polyethylene which is sensitive by being mixed with benzophenol, hexachlorobenzol, sulfur monochloride, or hexachlorotetrahydronaphthalene. The material known by the name of "Riston" and manufactured by DuPont may also be used; on its surface a cross-linking process, and thus a hardening of the material, takes place under the influence of ultraviolet light, The carrier according to the present invention with surface zones of differing degrees of hardness may also take the form of a carrier in which information is stored on its surface in the form of raised and lowered surface portions, but the lowered portions are completely filled either wholly or in part with a mass which is soft compared to the carrier to give the carrier a flat surface. A reversal of this is also conceivable, i.e., that a harder material is applied to the surface of a carrier having a lesser hardness, which mass partially or completely fills the surface depressions.

When a carrier surface having projections and depressions and made of a hard material is filled with a soft mass, a soft polyvinyl chloride may be used, for example. The harder carrier may be of hard polyvinyl chloride.

The depressions in a carrier can be filled with a hard mass of, for example, boron nitride which also has lubricating properties.

In the production of a carrier according to the present invention it is important that the differences in hardness between the surface zones of differing hardness along a track be sufficiently distinct. With elastically deformable carrier surfaces the harder surface zones may have a modulus of elasticity, for example, of 40,000 kgf/cm$^2$ (kgf = kilograms force), while the less hard surface zones may have, for example, a modulus of elasticity of 5,000 kgf/cm$^2$. These figures are intended only as an example. The moduli of elasticity however cannot always be arbitrarily selected because most cross-linkable materials do not exhibit such a large difference between the moduli of elasticity in the uncross-linked state and the cross-linked state.

When a carrier is used whose surface is plastically, i.e., permanently, deformable and which is thus destroyed due to the plastic deformations produced during scanning, so that it can be scanned only once, it is important that successive surface zones have resistances to changes in shape which are as different in value as possible.

The present invention also relates to a method for producing the carrier. This method is performed using a carrier material which is initially homogenous and whose hardness can be varied by irradiation, and by irradiating it with locally different intensities in a manner which corresponds to the information to be recorded. It has already been mentioned above that the material commercially available under the trade name of "Riston" is suitable for this purpose.

The locally different intensities can be produced by irradiation of the carrier surface with a beam of suitable radiation which is modulated by the information signal to be recorded and which effects a correspondingly varying change in the degree of hardness of the carrier surface, which variation corresponds to the information content, the beam being moved relative to the carrier surface in a direction parallel thereto. This embodiment of the method according to the invention is particularly suited for the manufacture of a carrier if only one carrier or only a few carriers are to be produced.

In order to produce a large number of identical carriers, however, a more suitable method according to the invention is one in which the irradiation with locally different intensities is effected by irradiating the carrier surface through a mask which has a locally differing radiation permeability corresponding to the information to be recorded on the carrier, the mask remaining stationary with respect to the carrier surface.

An arrangement suited for performing such a method corresponds to the arrangement used for producing contact copies from a photographic negative. The difference from contact copying is that here the copy does not constitute a photographic negative of the mask but rather will have a plurality of surface zones with respectively different degrees of hardness.

The material employed for performing the method may be a plastic which can be changed by irradiation, for example which under the influence of radiation, polymerizes, depolymerizes or cross-links. The modulated beam may effect hardening of the plastic. A hard intermediate region between adjacent tracks, or adjacent turns of the spiral track, which can be used in the same manner as a groove wall to guide a pickup, can be formed by irradiation with continuous constant-intensity light in addition to the irradiation with the modulated beam. The intermediate regions between the track turns may be arranged, for example, like the track, in a spiral shape on a circular carrier.

According to an advantageous further operation in the practice of the method for producing a carrier, the individual pulses to be recorded are shaped, by optically imaging the radiation emitters, by apertures, or by intensity control, in such a manner that the tracks become harder along their edges than along their center, the harder parts again being utilized to guide the pickup. In this connection, the features of the above-mentioned U.S. Application Ser. No. 168,073 can also be usefully applied if modified according to the requirements of the present invention. This means that the beam may be deflected at a high frequency in a direction transverse to the direction of the track and parallel to the carrier surface while being additionally intensity modulated at a rate related to the high frequency of the transverse deflection.

For a beam which is not deflected in a direction transverse to the direction of the track, its cross section in the plane of the carrier surface may be given the shape of a narrow lemniscate or of two acute triangles which together define the width of the track, whose apices abut one another, and whose bases are parallel to one another and to the direction of the track.

DESCRIPTION OF THE PREFERRED EMBODIMENTS

Figure 1:
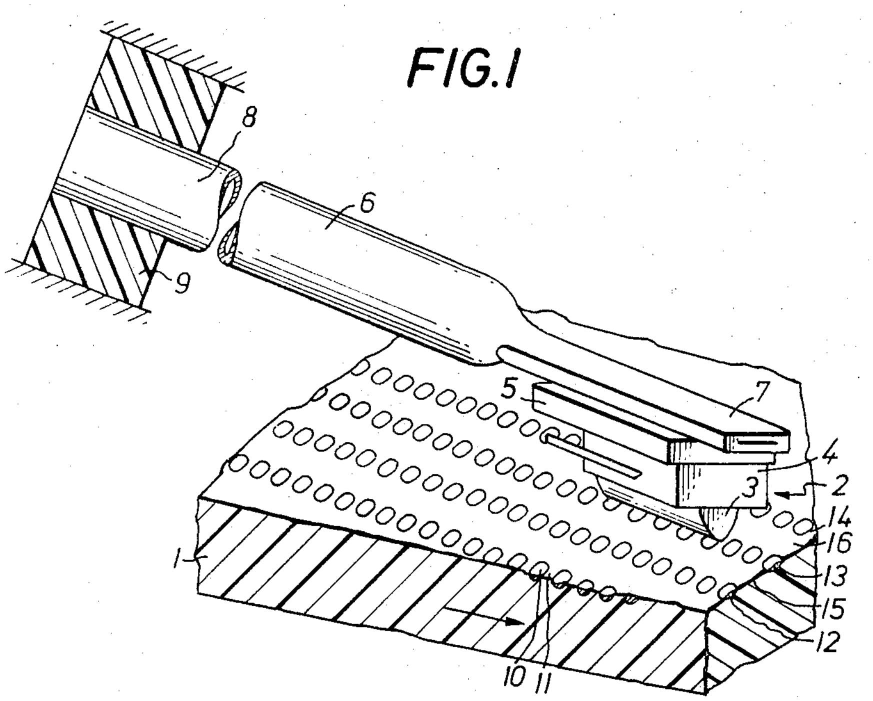
FIG. 1 is a perspective view of a pickup scanning one embodiment of a picture record disc according to the present invention.

FIG. 1 shows a carrier 1 and a pickup 2. The carrier 1 advances in the direction of the arrow underneath and past the stationary pickup 2. Only a portion of carrier 1 is shown. Pickup 2 includes a pickup stylus 3 and a pressure responsive transducer 4 provided with electrical connections which are not identified by reference characters, and an intermediate damping layer 5. The pickup is held by a mount tube 6 to whose one flattened end 7 it is cemented, while the other end 8 of mount 6 is clamped into an elastic cushion 9 of a yieldable plastic. This cushion is guided in such a manner that the pickup follows the track on the carrier.

The carrier is provided with physically compressible surface zones, such as 10 and 11. The arrangement of these surface zones along the scanning path, i.e., their number per unit of length and/or their length or spacing, represents the information stored on the carrier.

Compared to a carrier with surface undulations, the surface zones 11 of greater hardness are here the equivalent of the surface undulation peaks and the surface zones 10 of lower hardness are equivalent to the undulation valleys.

The surface zones 10 and 11 have such an elasticity that they are compressed by the substantially unyielding scanning surface of the pickup stylus 3 facing the carrier surface. The surface zones 11, however, exert a substantially greater pressure than the surface zones 10 on the pickup when they are compressed. The total reaction force by carrier 1 on pickup 2 is thus substantially produced by the deformations 11 so that almost the same effect is produced as if the surface zones 10 were not present.

As noted above, the pickup 2 is mounted so as to be substantially immovable in the direction normal to the surface of carrier 1. The pickup stylus 3 compresses the carrier surface, rather than simply deflecting the carrier downwardly at the point of contact, at least partly because the inertia of the carrier itself prevents it from undergoing any noticeable vertical movement at the high speed at which the stylus moves along the information track. The carrier is also maintained substantially immovable in the direction normal to its information bearing surface by an underlying air cushion which can be produced by the playback apparatus.

The surface zones containing the information are disposed along tracks 12, 13 and 14 on the carrier surface in the form of a succession of surface zones which differ from one another in hardness. The intermediate regions 15 and 16 between tracks 12 to 14, and also the edges of tracks 12 and 14, have the same hardness as the surface zones 11 and thus are harder than surface zones 10. These edges of the tracks, and the intermediate regions between the tracks, are thus less compressible by the pickup stylus 3 than the entirety of the surface zones along a track. The intermediate regions thus exert guiding forces on the pickup stylus 3 when it slides in a track so that the stylus is held in the track. If the pickup stylus were to tend to slide out of a track, it would have to slide onto the less compressible intermediate regions between adjacent tracks.

At the sectional surfaces of the illustration of carrier 1 it is indicated that the carrier material lying below the carrier surface at the softer zones 10 and forming part of these zones extends into the carrier only to a certain depth. These softer surface zones 10 may be produced by the influence of radiation, the radiation effecting, for example, a depolymerization of the otherwise polymerized carrier 1.

However, the present invention is not limited to this embodiment. It is just as possible for the carrier to consist, for example, of an initially uncross-linked plastic, and for the harder surface zones 11 and the intermediate regions between adjacent tracks or adjacent track turns to be subsequently cross-linked and thus made harder than the rest of the carrier. In this case it is the cross-linked portions of the carrier which would have been produced by the influence of radiation and these would extend into the carrier only to a certain depth.

Figure 2:
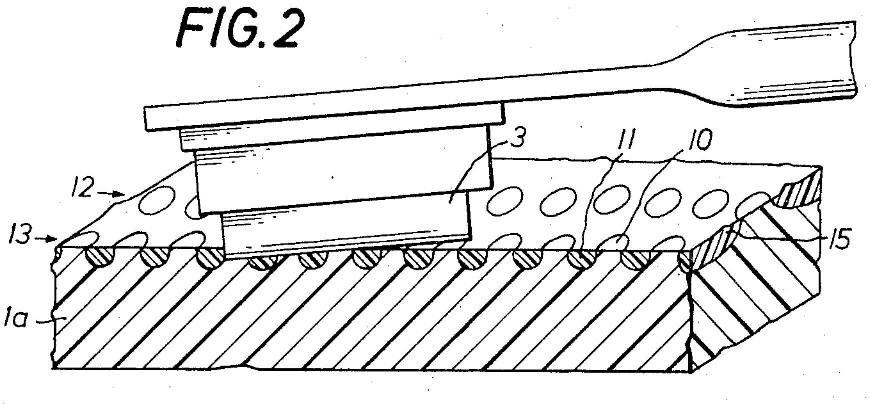
FIG. 2 is a view similar to that of FIG. 1 showing another embodiment of a record disc according to the invention.

FIG. 2 shows a carrier 1a of the latter type, the same reference numerals being used as in FIG. 1. Because FIG. 2 shows a cross section of the carrier along a track 13 being scanned, it can be seen how the pickup stylus sinks into, and compresses, the carrier surface and encounters the resistance of the harder surface zones 11. However, it can also be seen that these surface zones must have a certain minimum depth so that the pickup can sense them. The same applies for the softer surface zones 10 of FIG. 1.

Carriers of the type illustrated in FIG. 2, with compressible surface zones of differing degrees of elastic deformability, can be made particularly advantageously from plastics, particularly materials which polymerize or cross-link under the influence of high energy radiation such as electron, gamma, or ultraviolet radiation. These plastics harden at the temporarily exposed points; the unexposed material, however, remains unchanged.

The information can thus be applied in a simple manner by appropriate exposure of the carrier to suitable radiation without any developing procedures, etc., being required. For tape-type, i.e., linear, carriers this can be done by applying a modulated beam from a radiation source while advancing the carrier transverse to the beam. For circular, i.e., disc, carriers, such as picture records or sound records, for example, it is preferable to effect simultaneous exposure of the entire disc through a mask. Such an illumination device not only operates rapidly, but is also less expensive than presses for relief-type records since the only things required are a strong radiation source and suitable objective optics.

A light sensitive cross-linking of plastics can be realized, for example, by the admixture of peroxides to the plastics. Carriers according to the invention are produced preferably from polyolefins, such as low pressure polyethylene; in order to sensitize the polyethylene, it is mixed with benzophenone, hexachlorobenzol, sulfur monochloride ($S_2Cl_2$) or hexachloro-tetrahydronaphthalene.

Figures 3, 5, 6, 7:
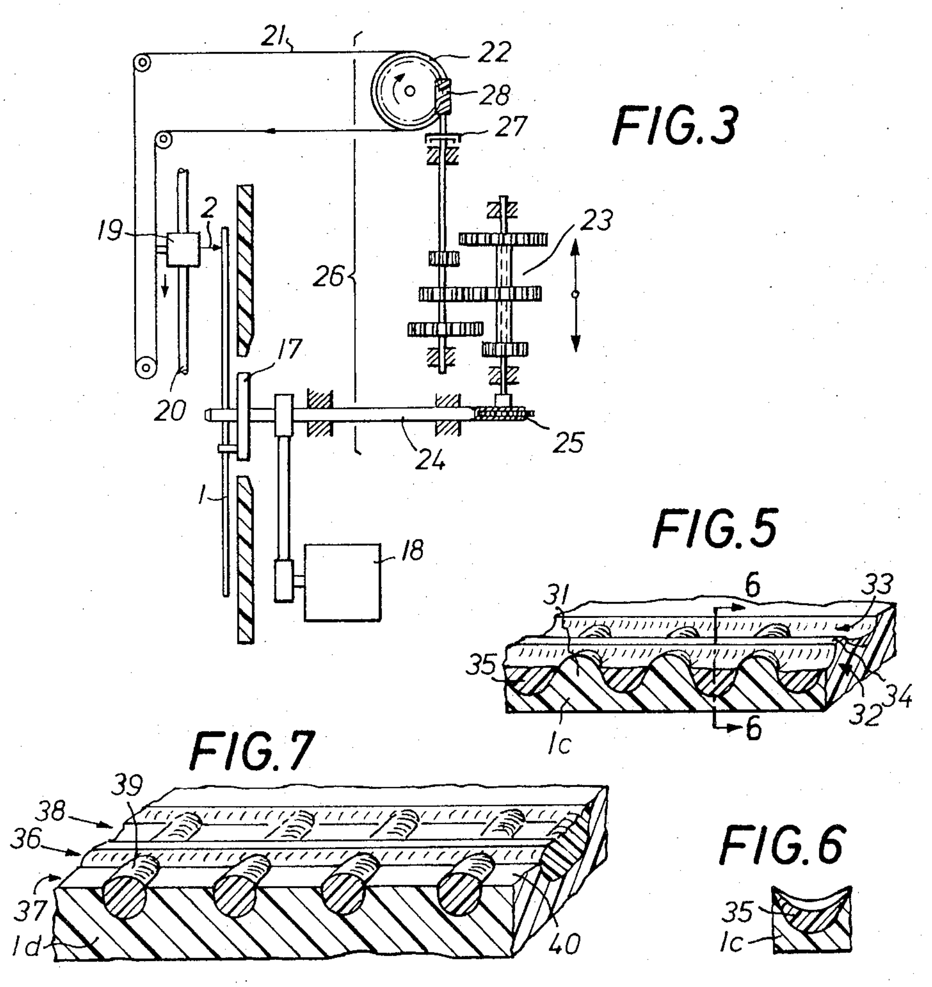
FIG. 3 is a partly cross-sectional, partly schematic view of an apparatus for playing record discs according to the invention.
FIG. 5 is a view similar to that of FIG. 4 of a further embodiment of a carrier according to the invention.
FIG. 6 is a cross-sectional view along line 6—6 of FIG. 5.
FIG. 7 is a view similar to that of FIG. 4 of another embodiment of a carrier according to the invention.

FIG. 3 shows the basic components of a playback device for a carrier according to the present invention. The device is disclosed in pending U.S. Application, Ser. No. 154,545, filed by Eduard Schuller, Gerhard Dickopp, Wolfgang Rainer, Horst Redlich and Hans-Joachim Klemp on June 18, 1971.

The carrier, a picture record disc 1, is mounted on a small diameter turntable 17 having a vertical drive shaft 24 arranged to be driven by a drive motor 18. Turntable 17 has at least one upstanding pin in addition to an axial post, for engaging suitable holes in disc 1 in order to positively drive the disc. A pickup 2 is elastically mounted in a positively guided carriage 19 constituting the pickup mount. The carriage 19 is moved across the picture record 1 on the slide rail 20 by means of a rope pulley 21 in such a manner that the pickup 2 moves in a radial direction.

The rope pulley 21 is driven by a rope disc 22 which is driven in turn by a drive train composed of a worm gear 28, a set of gears 23 and a drive member 25 constituted by a toothed wheel or a worm gear, for example, driven by the turntable drive shaft 24. Gear set 23 can be adjusted to provide any one of several gear ratios to permit a selection of the relationship between the rate of disc rotation and the rate of carriage advance. The entire forward movement drive is designated 26.

Between rope disc 22 and drive member 25 a coupling, or clutch, 27 is provided to permit decoupling of the forward movement drive. When the carrier 1 continues to rotate while clutch 27 is disengaged, the pickup will trace only one or a few turns of the track and then jump back under the influence of cushion 9 (FIG. 1) so that, in the case of a television recording, it is possible to produce a still picture, i.e., stop the action.

Upon variation of the transmission ratio of the gear set 23, the speed of forward movement of carriage 19 changes. If it is reduced, the pickup jumps back from time to time to a track it has already scanned so that it is possible to produce playback in slow motion, whereas with an increase in the speed of forward movement of carriage 19, playback can be effected with a time lapse, i.e., accelerated motion, effect. The clutch 27 may also be eliminated and its function taken over by arranging the worm 28 to be selectively disengageable from disc 22.

Figure 4:
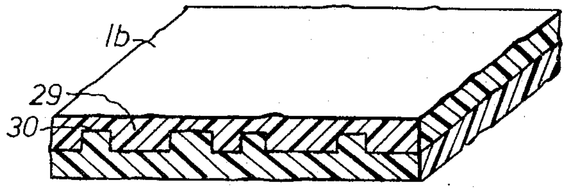
FIG. 4 is a perspective detail view of another embodiment of a carrier according to the invention.

FIG. 4 shows a carrier **1*b* which is initially provided in a known manner with a spatial recording composed of raised or projecting portions 30 and intervening recessed portions and which is subsequently coated with an elastic surface coating 29 in such a manner that a smooth surface results. The surface layer 29 has a lower modulus of elasticity, i.e., is softer, than the base material of carrier 1*b*. At those points where the carrier does not have any raised portions 30, the pickup stylus receives a much lower reaction pressure than at the zones of the raised portions 30 so that the scanning effect described in connection with FIG. 1** will result.

FIGS. 5 and 6 show a modification of the embodiment shown in FIG. 4. Here a carrier **1*c* is first provided with a spatial recording constituted by a train of undulations having raised portions 31 and extending along groove tracks 32, 33. The surface is then substantially, but not completely, flattened by filling in its depressions with a soft elastic mass 35 having a lower modulus of elasticity than the base material of carrier 1*c*. Advisably, the flattening is effected to such an extent that greasy or grease-type substances which might possibly accumulate on the carrier surface and which might interfere with playback can be pushed aside by the pickup stylus without difficulty. A suitable lacquer is advisably used for the mass 35.** However, soft substances with lubricating properties are also suitable and they have the additional advantages that they reduce friction between the carrier and the pickup and thus the wear of the pickup.

The incomplete filling of the depressions results, when the carrier mass and filler mass are appropriately selected, in a very favorable stylus penetration depth ratio between the hard and soft parts of the carrier.

Whereas FIG. 5 shows the longitudinal profile of a scanning groove, FIG. 6 shows the cross-sectional profile of the groove along the section line 6—6 of FIG. 5. Here the scanning track on the carrier is provided with a slight groove to better guide the pickup. It is recommended to provide such a slightly groove-type scanning track also on the carrier according to FIGS. 1 and 2 for better guiding of the pickup unless the nature of the information distribution over the carrier surface does not require an accurate tracing of the track. The intermediate region 34 between tracks 32 and 33 has a greater hardness, as do the raised portions 31, than the mass 35 which fills the depressions between the raised portions.

FIG. 7 shows a further embodiment of a carrier 1*d* according to the present invention in which there are, as in FIGS. 5 and 6, not only surface zones having respectively different degrees of hardness, but also raised portions on the carrier surface which in part form the intermediate region 36 between adjacent tracks 37 and 38 and in part form raised portions at surface zones 39 along the tracks. These raised portions have a greater hardness than the remaining surface zones 40 between, and at a lower height than, zones 39.

The raised portions at 36 and 39 can be produced in that either the hard surface portions or zones, respectively, of carrier 1d are caused to swell or the soft surface zones 40 are caused to shrink. A shrinking process takes place during most of the cross-linking processes, while German Published Patent Application No. 1,151,535 discloses how certain carrier materials can be caused to swell. This is possible by treatment with a solvent. For a carrier of triacetate the solvent may be, for example, a 50 percent water-glycerin solution at room temperature. For a rubber carrier irradiated with electron beams swelling can be initiated by treatment with a petroleum ether/mineral oil solution.

It is advisable to have the surface zones of greater hardness at a somewhat greater height than those of lesser hardness because this increases the pressure peaks caused by the hard surface zones acting on the pickup stylus. It is inadvisable however to have the soft surface zones protrude substantially higher from the surface of the track than the hard surface zones because this would reduce in an undesired manner the pressure peaks produced by the hard surface zones acting on the pickup stylus.

Figure 8:
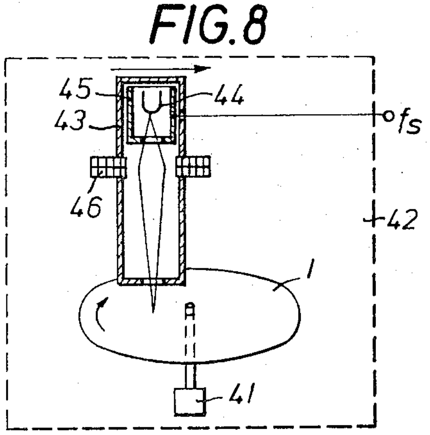
FIG. 8 is a simplified pictorial view of one embodiment of an arrangement for recording a record disc according to the invention.
Figure 9:
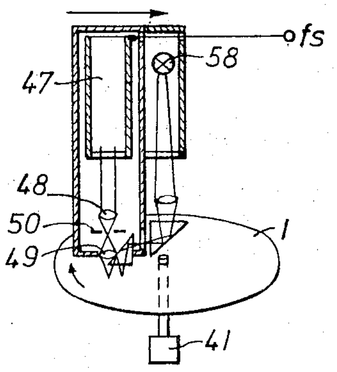
FIG. 9 is a view similar to that of FIG. 8 showing another arrangement for recording a disc according to the invention.

FIGS. 8–15 illustrate possibilities for recording information on a carrier. FIGS. 8 and 9 each show an arrangement in which a carrier 1 is caused to rotate by a motor 41. Thus both cases relate to a manufacturing process in which the beam used for recording has, relative to the carrier, a speed parallel to the carrier surface.

In the system of FIG. 8, the information is recorded on the carrier, or on a mask used to subsequently produce carriers, according to the invention by irradiation with an electron beam along a spiral track on the carrier or mask surface. The recording device 43 is accommodated in a vacuum-tight housing 42 at subatmospheric pressure and is moved radially across carrier 1 during the recording process, as indicated by the arrow. The carrier is, for example, a sensitized plastic foil or, if a mask is being produced, is a disc provided with a photosensitive layer. The electron beam emanating from cathode 44 is intensity modulated by means of Wehnelt cylinder 45 according to he signal frequency $f_s$ fed thereinto which is, for example, up to 3 MHz. The beam is focused by electron optics 46.

If instead of carrier 1 a photosensitive disc or foil is employed which upon recording of the signals exhibits a corresponding variation in its degree of darkening, this negative can be duplicated, after developing, in a contact copying process. A sensitive carrier for the resulting copy may be a plastic material which cross-links as a result of the irradiation and which is exposed by the radiation penetrating the negative, for example ultraviolet light. At the exposed points the plastic is polymerized and thus becomes harder than at the unexposed points.

In the apparatus of FIG. 9, the electron beam source of FIG. 8 is replaced by a light source, i.e., a laser source, 47. Its radiation is focused by lenses 48 and 49 on the surface of carrier 1, or instead on a mask for the mass production of carriers. The output of laser source 47 is intensity modulated by signals at the signal frequency $f_s$. An aperture 50 is disposed between lenses 48 and 49, but may also be disposed at the output of the laser source 47. This aperture is reproduced, i.e., imaged, on the carrier surface, while in FIG. 8 the electron optics 46 image cathode 44 on the carrier surface. In FIG. 9 a constant intensity light source 58 is additionally provided to illuminate carrier 1, or the mask, and thus to produce hardening of the carrier surface in the intermediate regions between adjacent tracks, or adjacent turns of the spiral track.

The mask produced, for example, with the arrangements shown in FIGS. 8 or 9 does not necessarily have to be used directly for the duplication of the carrier. It is also possible to make a transparent negative from this mask which then will serve to duplicate the carrier.

Figure 10:
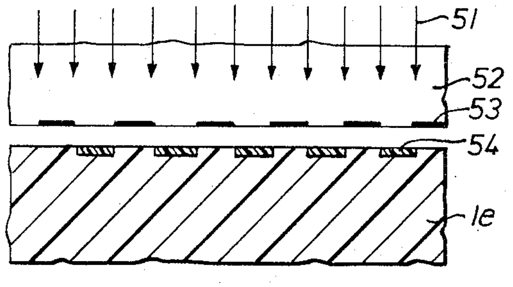
FIG. 10 is a cross-sectional detail view of an arrangement for making record copies according to the invention.

FIG. 10 illustrates the principle of carrier duplication. Beams 51 penetrate a mask 52 which has darkened portions 53 corresponding to the recorded information. On the surface of carrier 1*e*, which in the same manner as mask 52 is shown in section, there are produced within surface zones 54 individual hardened or softened regions, depending on the type of plastic employed.

Figures 11, 12, 13, 14:
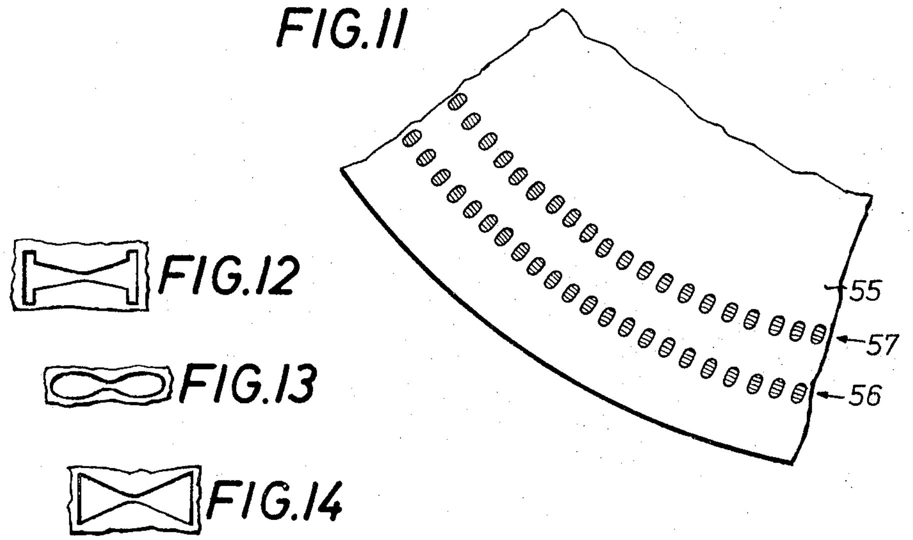
FIG. 11 is a pictorial detail view of a record copy according to the invention.
FIGS. 12, 13 and 14 are pictorial representations of three possible cross sections for the original recording beam.

FIG. 11 illustrates a portion of a mask 55 on which darkened portions appear along two successive tracks 56 and 57. When this mask 55 is used for a copying process according to FIG. 10, it is advisable for carrier 1*e* to be of a plastic which hardens under the influence of radiation 51. In this case the carrier surface hardens not only at the points where the mask is transparent along the track but also under the intermediate regions between tracks 56 and 57 of the mask of FIG. 11.

FIGS. 12 to 14 show examples for the shape of the aperture 50 of FIG. 9, or of the radiation source, for example the cathode 44 of FIG. 8. These shapes correspond to the beam cross section in the plane of the carrier surface. The total width of these shapes corresponds in FIGS. 13 and 14 to the track width while in FIG. 12 it corresponds to the track width plus the width of the adjacent intermediate regions between track turns. The cross-sectional shapes according to FIGS. 12 to 14 produce, when they are used to produce hardened sections on the carrier, an intensified hardening of the track edges and the beam cross section according to FIG. 12 also produces a hardening of the adjacent intermediate regions. When the beam cross section according to FIG. 12 is used, the constant light source 58 of FIG. 9 can be eliminated. FIG. 13 depicts a narrow lemniscate.

Figure 15:
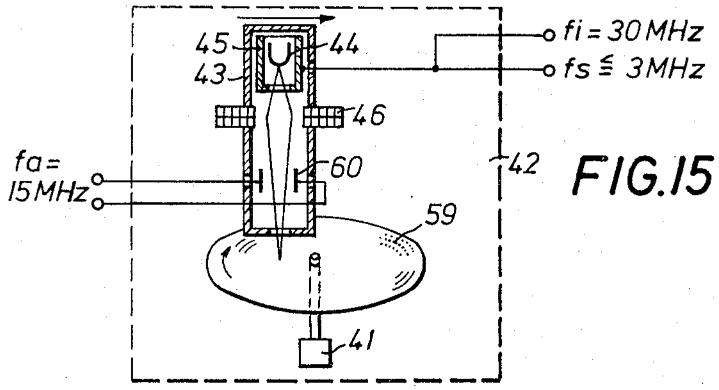
FIG. 15 is a view similar to that of FIG. 8 of another arrangement for recording a carrier according to the invention.

The recorder shown in FIG. 15 constitutes a further development of the embodiment of FIG. 8. In FIG. 15 the electron beam is deflected, according to the previously mentioned older proposal disclosed in U.S. Pat. Application Ser. No. 168,073, at a frequency $f_a$ transversely to the direction of the track, a deflection signal for this purpose being applied across electrodes 60. This frequency must be much higher than the highest signal frequency $f_s$, for example $f_a$ may equal 15 MHz. Furthermore, the intensity of the electron beam is modulated at twice the frequency $f_a$, i.e., at $f_i$, which may be, for example, 30 MHz. Irradiation of a photosensitive mask 59 by means of an arrangement as shown in FIG. 15 then produces, after developing, successive darkened portions along the track, the light impermeability of these portions being greatest along the center of the track. Such a mask can be further processed in the same manner as that described with reference to FIG. 11. While the arrangement according to FIG. 15 need not employ any of the beam cross sections shown in FIGS. 12 to 14, the beam cross section must be substantially smaller than the shortest wavelength of frequency $f_s$ to be recorded on mask 59. Reference numerals not specifically mentioned have the same meaning as in FIG. 8.

The carrier 1*e* of FIG. 10 may be one of those shown in FIGS. 1, 2, 7 respectively. The carriers shown in FIGS. 1, 2, 7 may consist of a support, for example a foil of polyvinylchlorid or polyester or metal-support, which support has on one side a layer which is sensitive to ultraviolet light.

The layer suitable for the carrier of FIG. 1 or 2 may be of "Riston"as already mentioned. The thickness of the layer may be about 50 $\mu$m. The ultraviolet light which is suitable for hardening the layer of "Riston" where irradiated preferably contains light with a wavelength of about 0,35 $\mu$m. The quantity of radiation which is used for hardening the layer depends from the composition of the layer and of the light. The quantity employed is at least 0.2 Joule/cm$^2$. (If a material is employed which interlaces under the influence of an electron beam, a quantity of radiation in an range of $4.10^{-7}$ till $5.10^{-5}$ Coulomb/cm$^2$ is needed, the electron beam being one accelerated with about 15 kV). In an arrangement as shown in FIG. 10 a fluorescent ultraviolet tube may be used for example, which tube may positioned in a distance of 5 to 20 cm over the mask. The exposure time may be about 1 minute. The layer of "Riston" consists of chain molecules before exposed. During exposure these chain molecules become crosslinked. That is the reason why the elasticity of the layer is changed by exposure. The hardness values for the hard zones are of the order of 30,000 kp/cm$^2$ (modulus of elasticity) (1 kp = 9,81 Newton), the hardness values for the soft zones lie about one decimal power beneath the value for the hard zones.

The depth of the modified zones in FIGS. 1, 2, 4, 5, 6, 7 shall correspond to the order of half of the shortest wavelength of the signal stored in the form of hard and soft zones. The groove density can be 100 grooves per mm in a radial direction of a rotatable carrier. Even 200 grooves per mm may be achieved. Stored wavelengths up to the order of a few $\mu$m are possible.

If the material which is between raised portions of the carrier surface, is softer than the raised portions like it is in FIG. 4 and like it is possible in FIGS. 5 and 6 soft polyvinylchlorid (modulus of elasticity about 15,000 kp/cm$^2$) or polyurethan (10,000 kp/cm$^2$) or celluloseacetobutyrat (15,000 kp/cm) may be used. Soft polyvinylchlorid for example may be brought as a solution in liquid ketons up to the carrier surface between the harder portions. In the other case if the material between raised portions is harder than the raised portions, boron nitride or epoxy resin or polyester (200,000 kp/cm$^2$) are suitable. Boron nitride may be sputtered or evaporated on the carrier surface provided with the spatial recording. The sputtering has to occure in an oblique direction to the carrier surface so that the sputtered material fills the spaces between adjacent raised portions of the surface. Epoxy resins or polyesters are brought in liquid state to the carrier surface to harden there. In both cases (hard or soft filling material) the carrier and its raised portions may be of polyvinylchlorid with a modulus of elasticity of about 30,000 kp/cm$^2$.

The projection heights on the surface of the carrier of FIG. 7 is in the order of one to ten percents of the depth of this projections that is to say some percents of half of the stored wavelengths.

It will be understood that the above description of the present invention is susceptible to various modifications, changes and adaptations and the same are intended to be comprehended within the meaning and range of equivalents of the appended claims.

We claim:

1. In the combination including:

a. a carrier having deformable means by which signals are stored in mechanical form, said deformable means being arranged along a path;

b. pressure sensitive pickup means capable of converting changes in mechanical pressure into electrical signals, said pickup means having a surface portion for engaging said deformable means; and c. means for causing relative movement of said pickup means along said path and for maintaining said surface portion of said pickup means and said deformable means in engagement with each other while said surface portion of said pickup means is maintained substantially immovable in the direction of the force acting to maintain said surface portion of said pickup means and said deformable means in engagement with each other, in consequence of which when there is relative movement of said pickup means along said path, said deformable means are deformed and said pickup means put out electrical signals which correspond to the signals that are stored in mechanical form, the improvement wherein said deformable means comprise a succession of zones disposed along the path, and said deformable means of said carrier is of a material which has a deformation resistance characteristic such that deformation of said deformable means at each zone by the same amount produces a reaction force which varies in values from one zone to the next in correspondence to the stored signals, whereby the reaction force exerted on said surface portion of said pickup means is proportional to the resistance to deformation of the portion of said deformable means contacted by said surface portion of said pickup at each instant.

2. In a carrier in which information signals are stored along a path on a deformable surface portion of the carrier and reproduced by a pressure-sensitive pickup having a scanning surface which bears against and compresses the deformable surface portion while the pickup travels along the path, the transducer output being a function of the reaction force exerted on the scanning surface by the carrier, the improvement wherein said carrier surface portion has a succession of zones disposed along the path, said surface portion being of a material which has a deformation resistance characteristic such that deformation of the surface portion at each zone by the same amount produces a reaction force which varies in value from one zone to the next in correspondence to the stored signals, whereby the reaction force exerted on the scanning surface is proportional to the resistance to deformation of the carrier surface portion contacted by the scanning surface at each instant.

3. A carrier as defined in claim 2 which is free, along the path, of substantial surface unevennesses which would be able to exert substantial pressures on the pickup scanning surface being guided along the path.

4. A carrier as defined in claim 2 wherein said carrier surface portion has zones of greater resistance to deformation protruding further from the carrier surface than intervening zones of lesser resistance to deformation.

5. A carrier as defined in claim 2 wherein the path is disposed in a groove.

6. A carrier as defined in claim 2, comprising a first member on which the information is stored at the carrier surface in the form of alternating projections and depressions and a second member at least partially filling the depressions and of a solid material which is less deformation-resistant than the material of said first member.

7. A carrier as defined in claim 6 wherein said second member is an elastic surface layer completely covering said first member.

8. A carrier as defined in claim 2 wherein said carrier is of a plastic which can be cross-linked by irradiation and which is irradiated to contain the information in the form of said zones with respectively different degrees of resistance to deformation.

9. A carrier as defined in claim 8 wherein the plastic is a polyolefin.

10. A carrier as defined in claim 8 wherein the plastic is a low pressure polyethylene mixed with benzophenone, hexachloro-benzol, sulfur monochloride, or hexachlorotetrahydronaphtha-lene to sensitize the polyethylene.

11. A carrier as defined in claim 2 wherein the path is composed of a series of parallel tracks and said surface portion further has intermediate regions located between adjacent tracks and having a greater resistance to deformation than the less deformation-resistant zones.

12. A carrier as defined in claim 11 wherein the resistance to deformation of the intermediate regions is the same as that of the most deformation-resistant zones.

13. A carrier as defined in claim 12 wherein said intermediate regions form a barrier between adjacent tracks.

14. A carrier as defined in claim 13 wherein the path is disposed in a groove.

15. A method for recording information signals along a path on a deformable surface portion of a carrier, which signals are to be reproduced by causing a scanning surface of pressure-sensitive pickup means capable of converting changes in mechanical pressure into electrical signals to bear against and compress the carrier surface portion, and producing relative movement of the pickup means scanning surface along the path while maintaining the pickup means and deformable surface portion in engagement with each other and maintaining the pickup means scanning surface substantially immovable in the direction of the force acting to maintain the pickup means and deformable surface portion in engagement with each other, so that the deformable surface portion exerts on the scanning surface a reaction force which is due to the compression of the deformable surface and whose variation is a function of the stored signals, said method comprising: providing a starting body of a homogeneous material whose resistance to deformation along the path can be varied by an amount dependent on the intensity of incident radiation of a particular type; and applying radiation of such type to a surface of the body with an intensity which varies from one zone to another along the path in accordance with the information signals to be recorded to produce zones having respectively different degrees of resistance to deformation.

16. A method as defined in claim 15 wherein said step of applying is carried out by disposing adjacent the body surface a mask having a radiation permeability pattern corresponding to the information to be recorded, maintaining the mask stationary with respect to the body surface, and directing radiation through the mask to the body surface.

17. A method as defined in claim 15 wherein the material of the starting body is a plastic which can be cross-linked by the radiation.

18. A method as defined in claim 15 wherein the starting body is of a plastic and the radiation effects an increased deformation resistance of the plastic.

19. A method as defined in claim 15 wherein said step of applying is carried out by irradiating the body surface with a beam, modulating the beam with a signal representing the information to be recorded so that the beam effects a varying change in the deformation resistance of the carrier surface to correspond to the information and moving the beam relative to the carrier surface in a direction parallel to the carrier surface.

20. A method as defined in claim 19 wherein the radiation increases the deformation resistance of the body and further comprising illuminating the body by a source of uniform light to produce intermediate regions of high deformation resistance extending adjacent the path serving to retain a pickup scanning surface on the path.

21. A method as defined in claim 15 wherein said step of applying is carried out in such a manner as to cause the average deformation resistance of the carrier to be greater along the edges of the path than along its center, whereby the edge regions of higher deformation resistance serve to guide a pickup scanning surface along the path.

22. A method as defined in claim 21 wherein the radiation is in the form of a beam whose cross section has the shape of a narrow lemniscate surface.

23. A method as defined in claim 21 wherein the radiation is in the form of a beam whose cross section has the shape of two acute triangles which together constitute the width of the path, whose apices abut one another, and whose bases are parallel to one another.

* * * * *